United States Patent [19]

Bai et al.

[11] 4,366,428

[45] Dec. 28, 1982

[54] ASYNCHRONOUS MOTOR DRIVE

[76] Inventors: Roland D. Bai, ulitsa Zorge, 225, kv. 9, Novosibirsk; Vladimir N. Brodovsky, 4 proezd Mariinoi Roschi, 10, kv. 96; Evgeny S. Ivanov, ulitsa Snezhnaya, 4, kv. 61, both of Moscow; Alexandr A. Kanep, ulitsa Nemirovicha-Danchenko, 28/1, kv. 46, Novosibirsk; Alexandr V. Feldman, ulitsa Geodezicheskaya, 1, kv. 52, Novosibirsk; Alim I. Chabanov, ulitsa Uritskogo, 12, kv. 73, Novosibirsk, all of U.S.S.R.

[21] Appl. No.: 217,005
[22] PCT Filed: Mar. 13, 1980
[86] PCT No.: PCT/SU80/00047
  § 371 Date: Nov. 10, 1980
  § 102(e) Date: Nov. 10, 1980
[87] PCT Pub. No.: WO80/01975
  PCT Pub. Date: Sep. 18, 1980

[30] Foreign Application Priority Data
  Mar. 15, 1979 [SU] U.S.S.R. ............... 2731207

[51] Int. Cl.³ ............................................. H02P 5/40
[52] U.S. Cl. ..................... 318/809; 318/798
[58] Field of Search ............... 318/807–812, 318/802, 803, 806, 798

[56] References Cited
U.S. PATENT DOCUMENTS
  3,465,226  9/1969  Sullivan ............... 318/138
  3,593,083  7/1971  Blaschke ............. 318/803
  3,805,135  4/1974  Blaschke ............. 318/803

FOREIGN PATENT DOCUMENTS
  736328  5/1980  U.S.S.R. ............... 318/809

OTHER PUBLICATIONS
Russian-Engineering Cybernetics Ed. V. V. Solodovnikov.

Primary Examiner—David Smith, Jr.

[57] ABSTRACT

An asynchronous motor drive comprising a transmitter (1) of position of the rotor of the asynchronous motor whose stator windings (6) are connected to an active stator current setter (22) and a reactive stator current setter (20) through a number of series-connected units which include a controlled current source (7), a phase-sensitive rectifiers unit (9), an adder (25), multipliers (17 and 18) and a phase converter (13). Inputs (11) of the unit (9) are connected to outputs of a multiphase voltage source (12) which comprises, in a series arrangement, a reference frequency setter (30), a frequency adder (31), a frequency divider (32), a phase converter (33) whose outputs are connected to the inputs (11) of the phase-sensitive rectifiers unit (9), and a controlled rotor current frequency generator (34). The generator (34) has its output connected to the input of the frequency adder (31). The input of the generator (34) serves as a control input (36) of the multiphase voltage source (12) and is electrically connected to the output of the active stator current setter (22).

1 Claim, 8 Drawing Figures

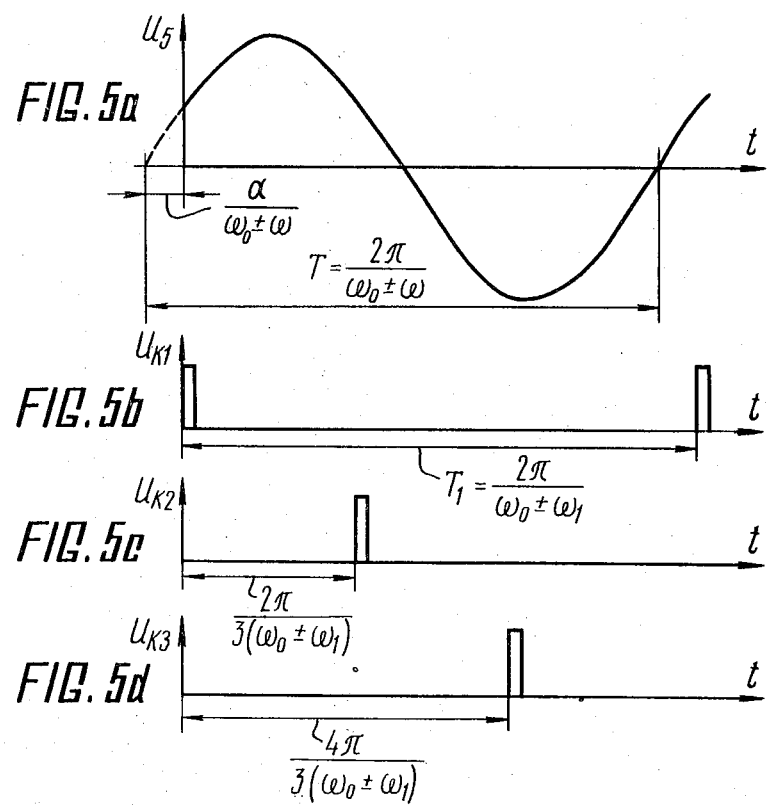

– –
ASYNCHRONOUS MOTOR DRIVE

TECHNICAL FIELD OF THE INVENTION

The present invention relates to asynchronous motor drives.

REVIEW OF THE PRIOR ART

The relatively low response of the existing types of asynchronous motor drives accounts for a limited travel accuracy of working members of NC machine tools.

There is known an asynchronous motor drive (cf.USSR Inventor's Certificate No 193,604, Cl. H 02p 5/28, published on Mar. 13, 1967 in the "Bulletin of Discoveries, Inventions, Industrial Designs and Trademarks", No. 7, 1967) comprising, in a series arrangement, active and reactive stator current setters, a rotor position transmitter, a rotor current frequency meter, a unit of phase-sensitive rectifiers, and a controlled current source connected to the stator windings of the asynchronous motor. In this drive, signals of the active and reactive stator current setters are applied to the control inputs of the phase-sensitive rectifiers unit via the exciting circuits of the rotor position transmitter and rotor current frequency meter.

The time constants of the rotor position transmitter and rotor current frequency meter are quite considerable, which accounts for a relatively slow response of the asynchronous motor drive and its inability to ensure accurate travel of working members of high-duty and high-accuracy NC machine tools.

There is further known an asynchronous motor drive comprising a rotor position transmitter. In this drive, the stator windings of the asynchronous motor are electrically connected through a controlled current source to outputs of a phase-sensitive rectifiers unit whose control inputs are electrically connected to setters of active and reactive stator currents. Other inputs of the phase-sensitive rectifiers unit are connected to outputs of a multiphase voltage source (cf. "Ustroystva i elementy system avtomaticheskogo regulirovaniya i upravleniya. Technicheskaya kibernetika", kniga 3, "Ispolnitelnye ustroystva i servomechanismy"/"Units and Components of Automatic Control Systems. Technical Cybernetics", Book 3, "Actuators and Servomechanisms"/, ed. by V. V. Solodovnikov, Machinostroyeniye Publishers, Moscow, 1976, pp. 266–271).

In this latter drive, signals of the active and reactive stator current setters are applied to the control inputs of the phase-sensitive rectifiers unit via the exciting circuit of the rotor position transmitter. However, this exciting circuit has a considerable time constant, which accounts for a relatively slow response of the drive and a low accuracy of controlling the torque of the output shaft. As a result, the drive under review is unable to ensure accurate travel of working members of machine tools.

It is an object of the present invention to provide an asynchronous motor drive with a reduced time lag of signals of the active and reactive stator current setters, wherefore, the drive would feature a faster response and a higher accuracy of controlling the torque, rotation speed and position of the output shaft.

SUMMARY OF THE INVENTION

The foregoing object is attained by providing an asynchronous motor drive comprising a transmitter of the rotor's position in the asynchronous motor whose stator windings are electrically connected via a controlled current source to outputs of a phase-sensitive rectifiers unit having its control inputs electrically connected to setters of active and reactive stator currents, other inputs of the phase-sensitive rectifiers unit being connected to outputs of a multiphase voltage source, the drive being characterized, according to the invention, in that it contains a phase converter connected to the output of the rotor position transmitter, two multipliers whose first inputs are connected to outputs of the phase converter, while their second inputs are connected to outputs of the active and reactive stator current setters, an adder connected with its inputs to outputs of the multipliers and with its output to the control inputs of the phase-sensitive rectifiers unit, a sinusoidal voltage former whose output is connected to the input of the rotor position transmitter, the multiphase voltage source comprising, in a series arrangement, a reference frequency setter whose output is connected to the input of the sinusoidal voltage former, a frequency adder, a frequency divider, a phase converter whose outputs are connected to other inputs of the phase-sensitive rectifiers unit, and a controlled rotor current frequency generator whose input is connected to the input of the frequency adder, the input of the controlled rotor current frequency generator serving as the control input of the multiphase voltage source, which control input is electrically connected to the output of the active stator current setter.

It is expedient that the drive should include a divider with its dividend and divisor inputs connected to the outputs of the active and reactive stator currents, respectively, and with its output electrically connected to the control input of the multiphase voltage source. This provides for travel of metal-working machine tools' working members within a broad range of output shaft speeds.

It is further expedient that the drive should contain a sensor of the asynchronous motor's temperature and a rotor current frequency correction unit whose first input is connected to the output of the asynchronous motor's temperature sensor, its second input being electrically connected to the active stator current setter, while its output is connected to the control input of the multiphase voltage source. The temperature sensor is necessary in situations when the temperature of the asynchronous motor varies within a broad range.

The asynchronous motor drive according to the invention features a fast reproduction of the output shaft torque upon the arrival of a signal of the active stator current setter, because there are no delay elements in the active stator current control circuit. As a result, the drive of this invention can be used as the basis for systems for controlling the speed and travel of working members of metal-working machine tools, featuring a high gain factor and, consequently, a high accuracy of reproducing prescribed parameters.

BRIEF DESCRIPTION OF THE ACCOMPANYING DRAWINGS

Other objects and advantages of the present invention will become more apparent from a consideration of the following detailed description of preferred embodiments thereof, taken in conjunction with the accompanying drawings, wherein.

Figure 1:
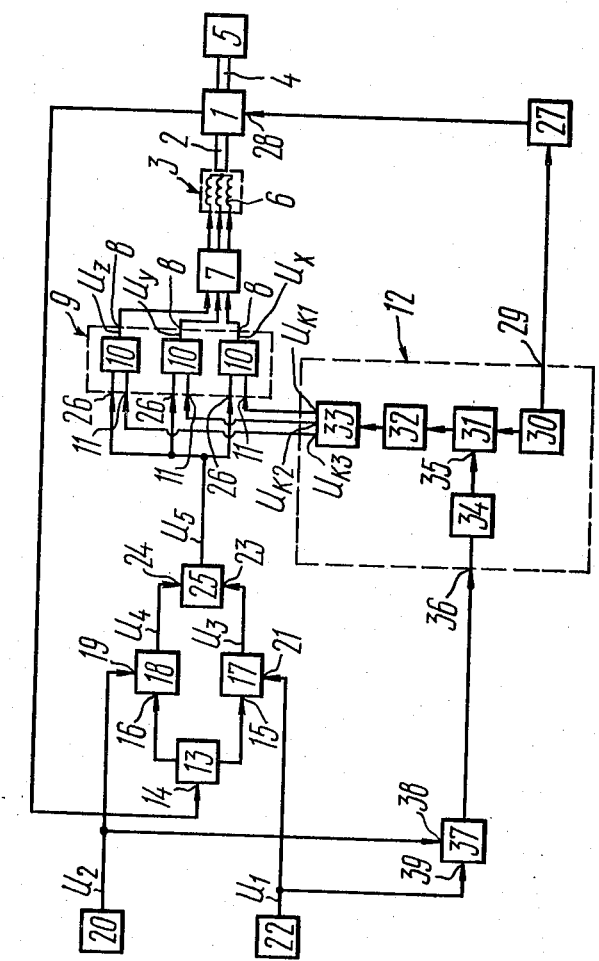
FIG. 1 is a key diagram of an asynchronous motor drive in accordance with the invention.

FIGS. 5 a, b, c, d are time plots of electric signals at the inputs of the phase-sensitive rectifiers unit in accordance with the invention.

DESCRIPTION OF THE PREFERRED EMBODIMENTS

According to the invention, the asynchronous motor drive comprises a transmitter 1 (FIG. 1) of position of a rotor 2 of an asynchronous motor 3. The rotor of the transmitter 1 is rigidly coupled to the rotor 2 of the asynchronous motor 3. Mounted on an output shaft 4 of the asynchronous motor 3 is a load 5 which is a working member of a machine tool. Stator windings 6 of the motor 3 are connected via a controlled current source 7 to outputs 8 of a unit 9 of phase-sensitive rectifiers. In the embodiment under review, the unit 9 contains three phase-sensitive rectifiers 10; this number is equal to that of the windings 6 of the motor 3. Inputs 11 of the unit 9 are connected to outputs of a multiphase voltage source 12 which is a three-phase source (the number of phases being equal to that of the rectifiers 10).

The drive further includes a phase converter 13 whose input 14 is connected to the output of the rotor position transmitter 1. Outputs of the converter 13 are connected to inputs 15 and 16 of multipliers 17 and 18, respectively. An input 19 of the multiplier 18 is connected to an output of a reactive stator current setter 20. An input 21 of the multiplier 17 is connected to an output of an active stator current setter 22. Outputs of the multipliers 17 and 18 are connected to inputs 23 and 24, respectively, of an adder 25 whose output is connected to control inputs 26 of the phase-sensitive rectifiers unit 9.

The drive further contains a sinusoidal voltage former 27 whose output is connected to an input 28 of the rotor position transmitter 1. The input of the sinusoidal voltage former 27 is connected to an output 29 of the multiphase voltage source 12. The multiphase voltage source 12 comprises, in a series arrangement, a reference frequency setter 30 whose output is the output 29, a frequency adder 31, a frequency divider 32, a phase converter 33 whose outputs are connected to the inputs 11 of the phase-sensitive rectifiers unit 9, and a controlled rotor current frequency generator 34 whose output is connected to an input 35 of the frequency adder 31, the input of the controlled rotor current frequency generator 34 being a control input 36 of the multiphase voltage source 12, which input 36 is connected to the output of the active stator current setter 22.

In order to ensure travel of working members of machine tools within a broad range of speeds of the output shaft 4 of the motor 3, the drive is provided with a divider 37. A divisor input 38 and a dividend input 39 of the divider 37 are connected to the outputs of the reactive stator current setter 20 and active stator current setter 22, respectively. The output of the divider 37 is connected to the control input 36 of the multiphase voltage source 12.

Figure 2:
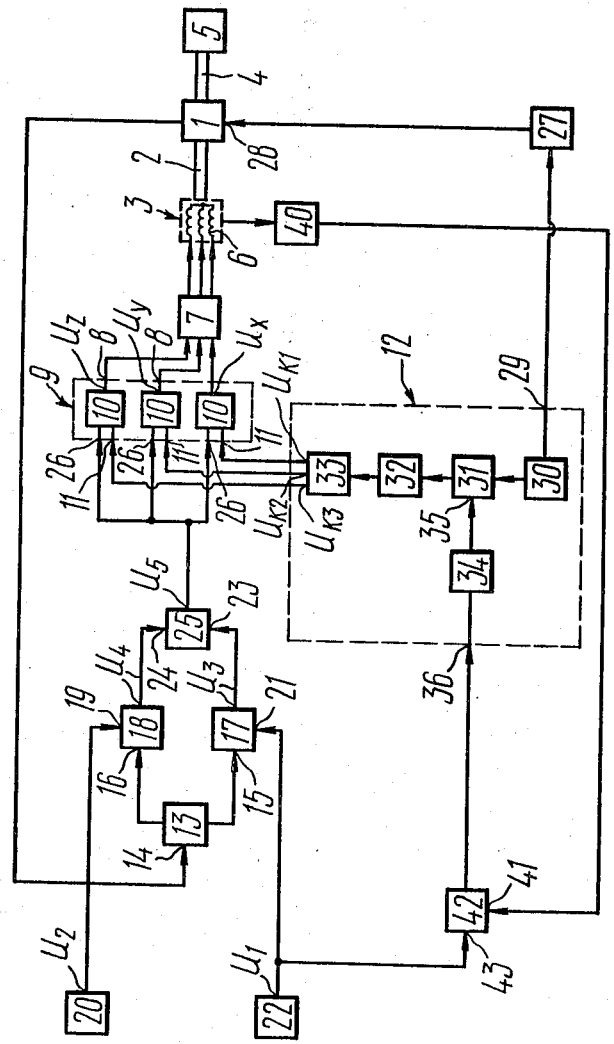
FIG. 2 is a key diagram of an asynchronous motor drive in accordance with the invention, provided with an asynchronous motor temperature sensor and a rotor current frequency correction unit.

To take care of situations when the temperature of the asynchronous motor varies over a broad range, the drive of this invention is provided with a sensor 40 (FIG. 2) of the asynchronous motor's temperature. The output of the temperature sensor 40 is connected to an input 41 of a rotor current frequency correction unit 42. A second input 43 of the correction unit 42 is connected to the output of the active stator current setter 22. The output of the correction unit 42 is connected to the control input 36 of the multiphase voltage source 12.

According to an alternative embodiment of the invention (not shown in FIG. 2), the control input 36 of the multiphase voltage source 12 is connected to the outputs of the reactive stator current setter 20 and active stator current setter 22, respectively, via the rotor current frequency correction unit 42 and divider 37 which are placed in series.

The transmitter 1 of position of the asynchronous motor's rotor, also referred to as the rotor position transmitter 1, is a rotary transformer which serves as a phase shifter. Single-phase or two-phase current is fed to the transmitter 1, depending on the type of voltage, single-phase or two-phase, across the output of the former 27; the phase of the signal across the output winding of the transmitter 1 is linearly related to the angle through which the rotor 2 of the asynchronous motor 3 is turned.

Figure 3:
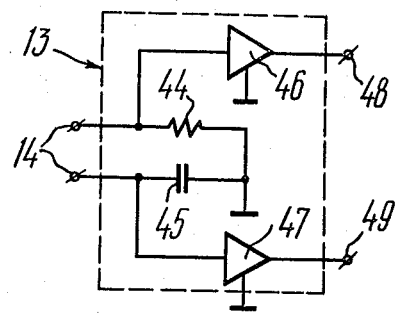
FIG. 3 is an electric diagram of the phase converter in accordance with the invention.

The phase converter 13 (FIG. 3) comprises a resistor 44 and a capacitor 45 which are placed in series. The leads of the resistor 44 and capacitor 45 serve as the input 14 of the phase converter 13. The converter 13 further contains two amplifiers, 46 and 47, whose inputs are placed in parallel with the resistor 44 and capacitor 45, respectively. The outputs of the amplifiers 46 and 47 are outputs 48 and 49, respectively, of the phase converter 13.

Each of the phase-sensitive rectifiers 10 (FIG. 4) comprises a semiconductor switch 50 which is conventionally shown as a mechanical contact. The first lead of the switch 50 is the input 26 of the phase(sensitive rectifier 10. The second lead is the input 11 of the phase-sensitive rectifier 10; the second lead is intended for the reception of signals which control the state of the switch 50. The third lead of the switch 50 is connected to the input of an amplifier 51 and to a capacitor 52. The output of the amplifier 51 is the output 8 of the phase-sensitive rectifier 10.

For a better understanding of the drive's operation, FIG. 5 presents time plots of signals across the inputs of the phase-sensitive rectifiers unit 9. The abscissa is time; voltage is laid off on the y-axis. The time plots of FIG. 5 illustrate operation of the unit 9 with the shaft 4 (FIGS. 1 and 2) rotating at a constant speed $\omega$. FIG. 5a is a time plot of voltage across the inputs 26 of the unit 9; FIG. 5b is a time plot of voltage across the input 11 of the first phase-sensitive rectifier 10; FIG. 5c is a time plot of voltage across the input 11 of the second phase-sensitive rectifier 10; FIG. 5d is a time plot of voltage across the input 11 of the third phase-sensitive rectifier 10.

The controlled current source 7 (FIG. 1) comprises voltage amplifiers is a number equal to that of the stator windings 6 of the motor 3. Each of the voltage amplifiers employs proportional negative output current feedback so that the voltage amplifier may function as a current amplifier. Thus the controlled current source 7 comprises controlled current amplifiers whereof each of intended to feed current to one of the stator windings 6 of the motor 3. The current amplifiers are built around transistors switched over at a high frequency, which accounts for a fast response of the current source; as a result, current of desired parameters is fed to the motor, 3 practically without any lag throughout the range of rotor speeds ω. The reference frequency setter 30, the frequency adder 31, the frequency divider 32, the phase converter 33 and the controlled rotor current frequency generator 34 all feature conventional circuitries. For example, the phase converter 33 is a ring switch connected to a former of short square pulses.

The asynchronous motor drive of the present invention operates as follows.

Consider operation of the drive with a constant rotation speed ω of the rotor 2 (FIG. 1) and a constant magnitude of signals at the outputs of the reactive stator current setter 20 and active stator current setter 22.

The active stator current setter 22 produces a d.c. voltage signals $U_1$ which is used to set both the active stator current value and that of torque of the shaft 4. The reactive stator current setter 20 produces a d.c. voltage signal $U_2$ which is used to set the reactive stator current value; the latter signal is also a flux linkage signal for the rotor 2 of the asynchronous motor 3. It should be noted at this point that the terms "active stator current" and "reactive stator current" are conventional. In a real asynchronous motor drive, the signal $U_2$ produces a stator current component oriented in the direction of the flux linkage axis of the rotor 2, and the $U_1$ signal produces a stator current component oriented at a perpendicular to the flux linkage axis of the rotor 2. The orientation is effected automatically by selecting a ratio between prescribed stator current components and a prescribed rotor current frequency $\omega_1$.

Figure 4:
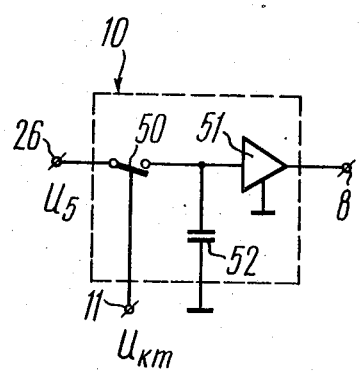
FIG. 4 is an electric diagram of the phase-sensitive rectifier in accordance with the invention.

The $U_1$ and $U_2$ signals are applied to the inputs 21 and 19 of the multipliers 17 and 18, respectively. Applied to the other inputs 15 and 16 of the multipliers 17 and 18, respectively, are voltage signals arriving from the outputs 48 (FIG. 3) and 49, respectively, of the phase converter 13 (FIG. 1). The single-phase signal of a constant amplitude and frequency $(\omega_o \pm \omega)$, arriving from the output of the rotor position transmitter 1, is converted by the phase converter 13 to a two-phase signal; the conversion is done with the aid of the resistor 44 (FIG. 3) and capacitor 45. From the resistor 44 and capacitor 44, voltages are applied to the amplifiers 46 and 47 to produce a two-phase system of voltages. Produced at the outputs of the multipliers 17 (FIG. 1) and 18 are voltages $U_3$ and $U_4$ which are described as follows:

$$\begin{cases} U_3 = A \cdot U_1 \sin(\omega_o \pm \omega)t \\ U_4 = A \cdot U_2 \cos(\omega_o \pm \omega)t, \end{cases}$$

where
A is the amplitude of signals across the outputs of the converter 13; and
ω is the reference frequency. p The $U_3$ and $U_4$ voltages are added up by the adder 25 which is a scale-up amplifier at whose output there is produced an a.c. signal $U_5$ (FIG. 5a) of an amplitude $A\sqrt{U_1^2+U_2^2}$, frequency $(\omega_o \pm \omega)$, period T, and initial phase α. The $U_5$ signal is applied to the control inputs 26 (FIG. 1) of the phase-sensitive rectifiers unit 9. Applied to the inputs 11 of the unit 9 are voltage pulses $U_{km}$ (FIG. 4); "m" is the serial number of the phase of the multiphase voltage voltage source 12. In the embodiment under review, the unit 9 contains three phase-sensitive rectifiers 10, so m=3, and pulses $U_{k1}$ (FIG. 5b), $U_{k2}$ (FIG. 5c) and $U_{k3}$ (FIG. 5d) make up a three-phase system of pulses whose frequency is $(\omega_o \pm \omega_1)$. The pulses $U_{k1}$, $U_{k2}$ and $U_{k3}$ control the state of the switches 50 (FIG. 4) of the three phase-sensitive rectifiers 10 (FIG. 1) of the unit 9. Upon the arrival of $U_{km}$ pulses, the switches 50 (FIG. 4) close and voltage $U_5$ is applied to the capacitors 52 which store voltage values after an opening of the switches 50 throughout the period $$T_1 = \frac{2\pi}{\omega_o \pm \omega_1}.$$

The amplifier 51 transmits the signal from the capacitor 52 to one of the inputs of the controlled current source 7; for all practical purposes, this is done without loading the capacitor 52.

In order to rule out a time lag of the phase-sensitive rectifier 10, the capacitance of the capacitor 52 is selected to be of a sufficiently small value; for the same purpose, the charge-discharge circuit of the capacitor 52, which incorporates the closed switch 50, has a low ohmic resistance. In order to obtain sinusoidal voltages across the outputs 8 under such conditions and with a sinusoidal $U_5$ signal, the input resistance of the amplifier 51 is selected to be great enough, and these conditions ar satisfied: $\omega_o > \omega_1$, and $\omega_o > \omega$. As a result, a three-phase system of sinusoidal voltages $U_x$, $U_y$ and $U_z$ is produced across the outputs 8 of the unit 9 (FIGS. 1 and 2):

$$U_x = K_1 \sqrt{U_1^2 + U_2^2} \sin(\pm\omega \pm\omega_1)t$$

$$U_y = K_1 \sqrt{U_1^2 + U_2^2} \sin\left[(\pm\omega \pm\omega_1)t + \frac{2\pi}{3}\right]$$

$$U_z = K_1 \sqrt{U_1^2 + U_2^2} \sin\left[(\pm\omega \pm\omega_1)t + \frac{4}{3}\pi\right],$$

where $K_1$ is the proportionality factor.

The three voltages serve as setting signals for the current amplifiers of the controlled current source 7 which feeds sinusoidal currents to the stator windings 6 of the asynchronous motor 3. The amplitude of these currents is proportional to $\sqrt{U_1^2+U_2^2}$; their frequency is equal to $(\pm\omega\pm\omega_1)$. The rotation speed of the rotor 2 is equal to $\pm\omega$; hence, the frequency of currents of the rotor 2 is $\pm\omega_1$. The drive obtains the current frequency of the rotor 2 according to this expression:

$$\omega_1 = \frac{U_1}{U_2} \cdot \frac{1}{T_2},$$

Where $T_2$ is the time constant of the circuit of the rotor 2.

It must be pointed out that the amplitude of stator currents is determined by the square of the sum of the $U_1$ and $U_2$ signals and that the nominal current frequency of the rotor 2 is obtained with the nominal value of the stator current amplitude. It is inferred from these statements that the active and reactive stator current components are determined by the $U_1$ and $U_2$ signals, respectively; with a constant $U_2$ signal, the torque of the drive's shaft is linearly proportional to the $U_1$ signal; the $U_2$ signal determines the flux linkage of the rotor. All these inferences are correct, because the drive according to the present invention makes use of the frequency-current method of controlling asynchronous motors, disclosed in the above-mentioned USSR Inventor's Certificate No. 193,604.

For the reference frequency $\omega_o$ to form part of the frequencies of signal applied to the inputs 26 and 11 of the unit 9, signals of frequencies divisible by $\omega_o$ are applied to the inputs of the frequency adder 31, whereas a signal whose frequency is $\omega_o$ is applied to the input of the sinusoidal voltage former 27. The controlled rotor current frequency generator 34 produces a signal whose frequency is divisible by the rotor current frequency $\omega_1$, which signal is applied to the second input 35 of the frequency adder 31. Depending on the sign of the control signal across the input of the generator 34, the adder 31 adds up or substracts the frequencies of signals of the setter 30 and generator 34. The total frequency of signals at the output of the frequency adder 31, which is a multiple of the sum total of frequencies ($\omega_o \pm \omega_1$), is converted by the frequency divider 32 to a single-phase voltage frequency ($\omega_o \pm \omega_1$) which is, in turn, converted by the phase converter 33 to multiphase pulses $U_{km}$ whose frequency is ($\omega_o \pm \omega_1$). The former 27 converts single-phase square voltage pulses of a frequency $\omega_o$ to single-phase or two-phase sinusoidal voltage of a frequency $\omega_o$, which is applied to the rotor position transmitter 1. From the output of the transmitter 1, voltage of a frequency ($\omega_o \pm \omega$) is applied via the units 13, 17, 18 and 25 to the inputs 26 of the unit 9.

Thus the use of signals of the setter 30 in two control channels provides for the arrival of signals of frequencies ($\omega_o \pm \omega$) and ($\omega_o \pm \omega_1$) at the inputs 26 and 11, respectively, of the unit 9.

The setter 20 forms a signal $U_2$ of a constant magnitude, wherefore during operation of the asynchronous motor 3 and the flux linkage of the rotor 2 is maintained at a constant level. The setter 2 forms a signal $U_1$ of a variable magnitude, which is used to control the torque of the drive. This signal is passed through the multiplier 17, adder 25, the phase-sensitive rectifiers unit 9 and controlled current source 7 so that current of desired parameters is fed to the stator windings 6 of the motor 3; as this signal is sent through the unit 34, it ensures a desired current frequency $\omega_1$ of the rotor 2. Thus the torque M of the motor 3 is derived from the expression:

$$M = K_M \cdot U_1,$$

where $K_M$ is the proportionality factor.

There is no time lag in the circuits through which the $U_1$ signal is transmitted, so under both static and dynamic conditions, the torque M of the motor 3 corresponds to the $U_1$ signal. The combination of a quick-action control system and a highly dynamic asynchronous motor with a short-circuited rotor provides for an extremely fast and accurate control of the torque M. As a result, the drive according to the invention is readily applicable to high-accuracy metal-working machine tool control systems.

To ensure travel of working members of metal-working machine tools within a broad range of output shaft torque values, while maintaining a constant output shaft power, the signal $U_2$ is controlled at the output of the setter 20. In this case the control signal for the generator 34 is formed by the divider 37. The $U_1$ signal is applied to the dividend input 39; the $U_2$ signal is applied to the divisor input 38. This changes the characteristic slope of the signal across the input of the generator 34 and produces a rotor current frequency $\omega_1$ which is determined by this expression:

$$\omega_1 = \frac{U_1}{U_2} \cdot \frac{1}{T_2}.$$

If the value of the $U_2$ signal varies, the divider 37 ensures a linear relationship between the torque M and $U_1$.

The foregoing embodiments of the invention assure a very fast and accurate torque control on the assumption that operation of the drive is accompanied by only slight changes of the parameters of the rotor circuit, such as the active resistance of that circuit, which determines the time constant $T_2$ of the rotor circuit.

However, operation of the drive may be accompanied by significant changes of the temperature of the asynchronous motor. Such temperature variations must be taken into account, because they affect the resistance and time constant $T_2$ of the rotor circuit; if temperature variations are ignored, the current frequency $\omega_1$ of the rotor 2 will not correspond to a desired scale. As a result, the torque of the motor 3 will not correspond to the $U_1$ signal under both static and dynamic conditions.

In order to maintain the accuracy of torque control with a varying temperature of the motor 3 (FIG. 2), a control signal is applied via the correction unit 42 to the control input of the generator 34. The $U_1$ signal is applied to the input 43; applied to the input 41 is a signal arriving from the temperature sensor 40. The unit 42 changes the slope characteristic of the signal which is then applied to the control input of the generator 34. With an increasing temperature of the motor 3, the signal across the output of the temperature sensor 40 increases; with a predetermined value of the $U_1$ signal, the signal at the input of the generator 34 also increases; as a result, the current frequency $\omega_1$ of the rotor 2 increases.

In situations when the motor temperature varies and the stator current is controlled by the $U_1$ and $U_2$ signals, the signal to control the generator 34 is also formed by the correction unit 42; a signal from the output of the temperature sensor 40 is applied to the input 41 of the correction unit 42; a signal from the output of the divider 37 is applied to the input 43 of the correction unit 42.

The mechanical characteristics of the drive according to the invention are highly suitable for its intended applications. Within the working range of rotation speeds, the torque is only determined by the $U_1$ signal. A drive with such characteristics can be used to directly control the load acceleration, in which case the active stator current setter 22 functions as a load acceleration setter.

The drive according to the invention can also be used to control the speed of rotation of the load. In such cases it is provided with a speed setter and tachogenerator (not shown in FIG. 1) which are mounted on the output shaft 4 of the motor. The active stator current setter is designed as a speed controller at whose signals of the speed setter are compared with those of the tachogenerator.

The drive according to the invention can be used to control the position of the load, in which case it is provided with a load positioner (not shown in FIG. 1). The function of the latter is performed by the rotor position transmitter 1.

The frequency of voltage supplied to the transmitter 1 is $\omega_o > > \omega$; this means that the rotation angle of the load can be measured to a sufficiently high accuracy. In such cases the active stator current setter 22 is designed as a load positioner. This makes it possible to dispense with a special load positioner and simplifies the design of the drive as a whole.

The drive according to the invention features a fast response and high torque control accuracy, which makes it readily applicable to the production of fast-response, high-accuracy systems for controlling the speed and position of working members of various machine tools. The ultimate result is increased productivity and improved quality.

COMMERCIAL APPLICABILITY

The asynchronous motor drive according to the invention is primarily intended to control travel of working members of high-accuracy numerically controlled metal-working machine tools. Drives of this type can also be used for fast and accurate displacement of any loads within a broad speed range.

We claim:

1. An electric drive for an asynchronous motor having a plurality of stator windings and a rotor comprising:
    a sensor for sensing the angle of rotation of the rotor of the asynchronous motor, said sensor having an input and an output;
    a phase converter having an input and first and second outputs, said input being connected to the output of said angle sensor;
    a first multiplier unit having first and second inputs, and an output, the first input being connected to the first output of said phase converter;
    a second multiplier unit having first and second inputs and an output, the first input being connected to the second output of said phase converter;
    an active stator current setter having an output connected to the second input of said first multiplier unit;
    a reactive stator current setter having an output connected to the second input of the said second multiplier unit;
    an adder having first and second inputs and an output, the first input being connected to the output of said second multiplier unit and the second input being connected to the output of said first multiplier unit;
    a plurality of phase sensitive rectifier corresponding to the number of stator windings, each having a first input, a control input and an output, the control input of each rectifier being connected to the output of said adder;
    a controlled current source having a plurality of inputs and outputs corresponding to the number of said rectifiers, said inputs being connected respectively to the outputs of the phase phase sensitive rectifiers, the outputs being respectively connected to said stator windings;
    a sinusoidal voltage former having an input and an output, the output being connected to the input of said angle sensor;
    a polyphase voltage source, comprising:
        a reference frequency setter having first and second outputs, the first output being connected to the input of said sinusoidal voltage former;
        a frequency adder having first and second inputs and an output, the first input being connected to the output of said reference frequency setter;
        a frequency divider having an input and an output, the input being connected to the output of said frequency adder;
        a phase converter having an input and a plurality of outputs, the input being connected to the output of said frequency divider and the outputs being connected respectively to the inputs of said phase sensitive rectifiers;
        a controlled rotor current frequency generator having an input and an output, the output being connected to the second input of said frequency adder;
    a temperature sensor for sensing the temperature of the asynchronous motor, having an output;
    a rotor current frequency correction unit having first and second inputs and an output, the first input being connected to the output of said active stator current setter, the second input being connected to the output of said temperature sensor and the output being connected to the input of said controlled rotor current frequency generator.

* * * * *